Patented Jan. 18, 1949

2,459,176

UNITED STATES PATENT OFFICE 2,459,176

PROCESS OF PREPARING OIL ACID MODIFIED ALKYD MATERIAL

Charles G. Moore, River Forest, Ill., assignor to The Glidden Company, Cleveland, Ohio, a corporation of Ohio No Drawing. Application June 8, 1945, Serial No. 598,406

6 Claims. (Cl. 260—22)

This invention relates to a procedure for producing a reaction product of a fatty acid monoglyceride and maleic anhydride, with an acid value below 80–100, which is miscible with various fatty oils and still retains its solubility in petroleum solvents.

If one mol of fatty acid monoglyceride is heated together with one mol of maleic anhydride at 450° F., until the acid value is reduced to 30–60, several things may happen, depending upon the oil acid used, as well as the total amount of materials employed. The whole mass may gel, if, for example, China-wood oil acids are used. If the reaction is carried out in a small way (200–300 gms. total) with linseed or soya oil fatty acid monoglyceride, a viscous mass, miscible with other oils and soluble in petroleum solvents may be obtained. If a larger mass (5–10 lbs. or more) of linseed or soya fatty acid monoglyceride is reacted with maleic anhydride at the same temperature, the acid value may be reduced to 30–60 without gelation, but on allowing this reaction product to cool by itself at room temperature, the whole mass becomes very viscous and finally gels. This gel is not miscible with other oils and is insoluble in mineral spirits. This latter phenomenon is well known, and is mentioned by Rosenblum in United States Patent No. 2,063,855. This gelling at 450° F. is due to the fact that polymerization of the product proceeds at a much more rapid rate than esterification under these temperature conditions.

The present invention contemplates a method by which a fatty acid monoglyceride may be reacted with maleic anhydride to produce a viscous oil of acid value 30–60, or at least below 80–100, and which is miscible with other oils and resins, and is soluble in mineral spirits, when carried out at elevated temperatures such as 450° F. or higher or lower as may be desired. The procedure involved is to first bring the reacting products together at a low temperature and mix them together thoroughly so as to produce a mix of uniform composition. The temperature is then rapidly raised to the top heat for the desired length of time and the product then cooled rapidly to, or near to, room temperature as may be required to prevent further polymerization and gelation. The monoglyceride should be one prepared by esterification of glycerin with the fatty acid to a point such that the acid number of the reaction product is 20 or less. So-called monoglycerides prepared by alcoholysis are not suitable.

Several methods of carrying out this principle may be employed. Probably one of the simplest methods is to mix the monoglyceride with the maleic anhydride, heat rapidly to 450° F., hold the desired time and then cool by discharging the mass into an oil such as linseed, soya, or perilla, which is at room temperature, thus cooling the reaction product very quickly. Conversely a large mass of cold oil may be introduced into the reaction mass at 450° F., thus quickly cooling below 200–300° F.

Another method is to mix the monoglyceride and maleic anhydride together at a low temperature, such as about 300° F., the material may then be pumped through a coil where it is heated quickly to about 450° F., for the desired period of time and then passed on to a water cooled coil which quickly reduces the temperature to substantially room temperature. In this form of the invention the process may readily be made continuous by the use of suitable proportioning and mixing devices and by the selection of the proper lengths of piping and rates of flow during the heating operation. Also the continuous operation may be employed where oil cooling is employed by causing a continuous stream of the resin to be mixed with a continuous stream of cold oil.

In carrying out any of these procedures, inert gases such as carbon dioxide or nitrogen or mixtures thereof may be employed to mix or blanket the reaction, and so reduce oxidation and yield a paler product than might otherwise be obtained.

The cooling may be effected by means of broken-up rosin, ester gum or other varnish gum.

*Example 1*

|   | Grams |
|---|---|
| Linseed fatty acid monoglyceride | 1436 |
| Maleic anhydride | 432 |
| Alkali refined linseed oil | 1800 |

The monoglyceride, prepared by esterification and having an acid number of 10–20, and maleic anhydride are heated together in an atmosphere of carbon dioxide. The temperature is rapidly raised to 450° F. and held at this temperature for 7–8 minutes. The whole mass is then quickly dumped into 1800 gms. of alkali refined linseed oil, and stirred in well. The acid value of this reaction mass before being diluted with the linseed oil was between 50–60. The final product after being thoroughly mixed had a temperature of 285° F. Upon cooling to room temperature, the whole was thoroughly miscible with other oils, and soluble in mineral spirits. After standing for a month, no appreciable increase in viscosity had occurred, and it was still compatible with other oils and mineral spirits.

*Example 2*

| | Grams |
|---|---|
| Linseed fatty acid monoglyceride | 1436 |
| Maleic anhydride | 432 |

The two materials were mixed together in an atmosphere of carbon dioxide and rapidly heated to 450° F. The mass was held at this temperature for ten minutes. This material was then transferred to a bucket and the material cooled rapidly by immersing the bucket into a large mass of cold water. While cooling, the heavy viscous oil was stirred continuously, in order to cool as quickly as possible. The final acid value of this oil was 53.7. This heavy oil was perfectly miscible with linseed and soya bean oils, and soluble in mineral spirits. The monoglyceride was prepared by esterification and its acid number was 10-20.

It is to be understood that other fatty acid monoglycerides than those of linseed may be employed. Also, other oils than linseed oil may be employed for cooling the reaction product. The monoglycerides of soya, perilla, sunflower, hempseed, cottonseed, safflower, and similar oils may be used. For cooling the reaction product, the oils enumerated above, as well as oiticica, China-wood, dehydrated castor oil, and the like may be employed, or solvents such as mineral spirits, hydrogenated naphthas, or suitable coal tar solvents and esters, ethers, ketones, etc. may also be used if desired.

It has been found necessary, in order to make this process operative, to make the monoglyceride by heating together molecular quantities of glycerin and oil fatty acids; in other words, 92 grams (1 mol) of 100% glycerin or the corresponding amount of 95% glycerin, together with approximately 280 grams (1 mol) of oil fatty acids. This 280 grams, of course, will vary somewhat depending upon the degree of unsaturation of the particular fatty acid being used. This, therefore, is the equivalent of 1 mol of fatty acid to 1 mol of the glycerin and upon heating together, the water of reaction is driven off and we have in essence the monoglyceride of the fatty acid. It may be assumed that the fatty acid is undoubtedly combined with one of the primary OH groups of the glycerin, and that the other primary hydroxyl group, as well as the secondary hydroxyl group, is free and uncombined and therefore may be subsequently reacted upon by the maleic anhydride.

There are several other methods of preparing the so-called monoglycerides, by means of adding a small amount of a catalyst such as caustic soda, caustic potash, litharge, strontium hydroxide, calcium hydroxide, or similar materials to the proper proportions of the triglyceride oil and glycerine. This would involve the use of 1 mol of the triglyceride and 2 mols of glycerine, in which two of the fatty acid radicals esterified with the glycerine in the triglyceride are split off and esterified with the free glycerin under the influence of the catalyst used in conjunction with this process. The mechanics of this method of making monoglyceride are not too well known but have frequently been used and the products of this method are at present time being used in the manufacture of alkyd resins using phthalic anhydride as a polybasic acid. The method of determining when the monoglyceride has been formed before the addition of phthalic anhydride in making alkyd resins from monoglycerides made as described above, is to test the miscibility of the so-called monoglyceride with 95% alcohol. It has been found that when the monoglycerides are completely soluble in alcohol to give a clear solution, phthalic anhydride may subsequently be added to give a homogenous, clear resin. After carrying out a great number of experiments, it has been found that maleic anhydride run without added phthalic anhydride or other polybasic acid will not react with a monoglyceride prepared by alcoholysis to give a homogeneous product.

If maleic anhydride is added to the monoglyceride made by the methods described in the preceding paragraph, the anhydride reacts rapidly and the whole mass separates into two distinct and separate layers, one of which jells quickly, while the other is still liquid, or, if sufficient agitation is used, the resulting product is a large number of small sized jelled particles, dispersed throughout a thin liquid, and when the agitation is discontinued, the small jelled particles settle to the bottom of the equipment.

Under the conditions described in this application, it is possible to add maleic anhydride without the addition of any phthalic anhydride or other materials to monoglyceride which has been prepared by heating together oil fatty acids and glycerin to the point where the acid number is not over 20, probably 10-20. The particular conditions for preparing the monoglyceride are of little consequence provided the acid number is not over twenty, and any suitable esterification procedure may be employed which will produce this condition.

This application is a continuation in part of application Serial No. 418,386, filed November 8, 1941, now abandoned.

Having described the invention, what is claimed is:

1. The process which consists essentially in intimately mixing together substantially equimolecular proportions of mono-glyceride, said mono-glyceride being one prepared by esterification of glycerin with equimolecular proportions of fatty acid selected from the class consisting of drying oil and semi-drying oil fatty acids to an acid number of not over 20, and maleic anhydride at a temperature below that at which any substantial reaction takes place, then quickly heating the mixture to 450° F., heating at this temperature until the reaction product has an acid number less than 80, then quickly cooling the reaction product to a temperature below that at which further polymerization takes place.

2. The process of claim 1 in which the reaction product is quickly cooled to below 300° F.

3. The process of claim 1 in which the cooling step is effected by intermixing the reaction product and a large mass of cool varnish ingredients.

4. The process of claim 1 in which the cooling step is effected by mixing the reaction product with a large amount of glyceride oil containing sufficient double bonds to possess drying properties.

5. The process of claim 1 in which the cooling step is effected by adding a sufficient amount of cool glyceride oil containing sufficient carbon-carbon double bonds to possess drying properties to lower the temperature to below 300° F.

6. The process which consists essentially in intimately mixing together substantially equimolecular proportions of mono-glyceride, said mono-glyceride being one prepared by esterification of glycerin with equimolecular proportions of fatty acid selected from the class consisting of drying oil and semi-drying oil fatty acids to an acid number of not over 20, and maleic anhydride at a temperature below that at which any substantial reaction takes place, then continuously flowing said mixture through a heating zone maintained at a temperature sufficient to rapidly heat the mixture to 450° F. and sufficient to maintain this temperature for a time sufficient to produce an acid number below 80, and then immediately cooling the product to a temperature below that at which further polymerization occurs, while continuing the flow of material.

CHARLES G. MOORE.

No references cited.